May 2, 1950          A. P. MANTZ          2,506,095
VIBRATION-DAMPING CAMERA MOUNT
Filed April 13, 1948          3 Sheets-Sheet 1
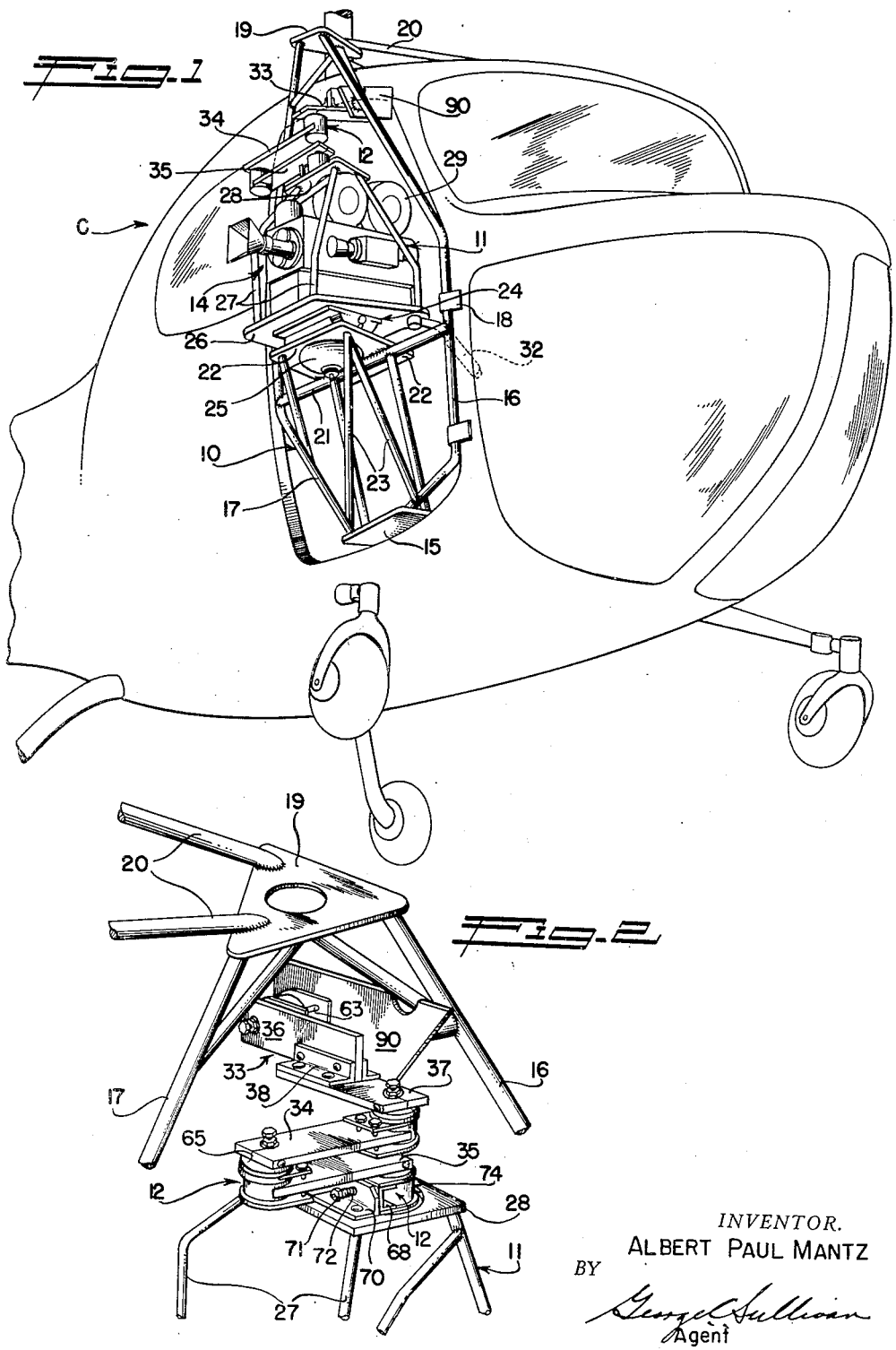
INVENTOR.
ALBERT PAUL MANTZ
BY
*George Sullivan*
Agent May 2, 1950          A. P. MANTZ          2,506,095
VIBRATION-DAMPING CAMERA MOUNT
Filed April 13, 1948          3 Sheets-Sheet 2
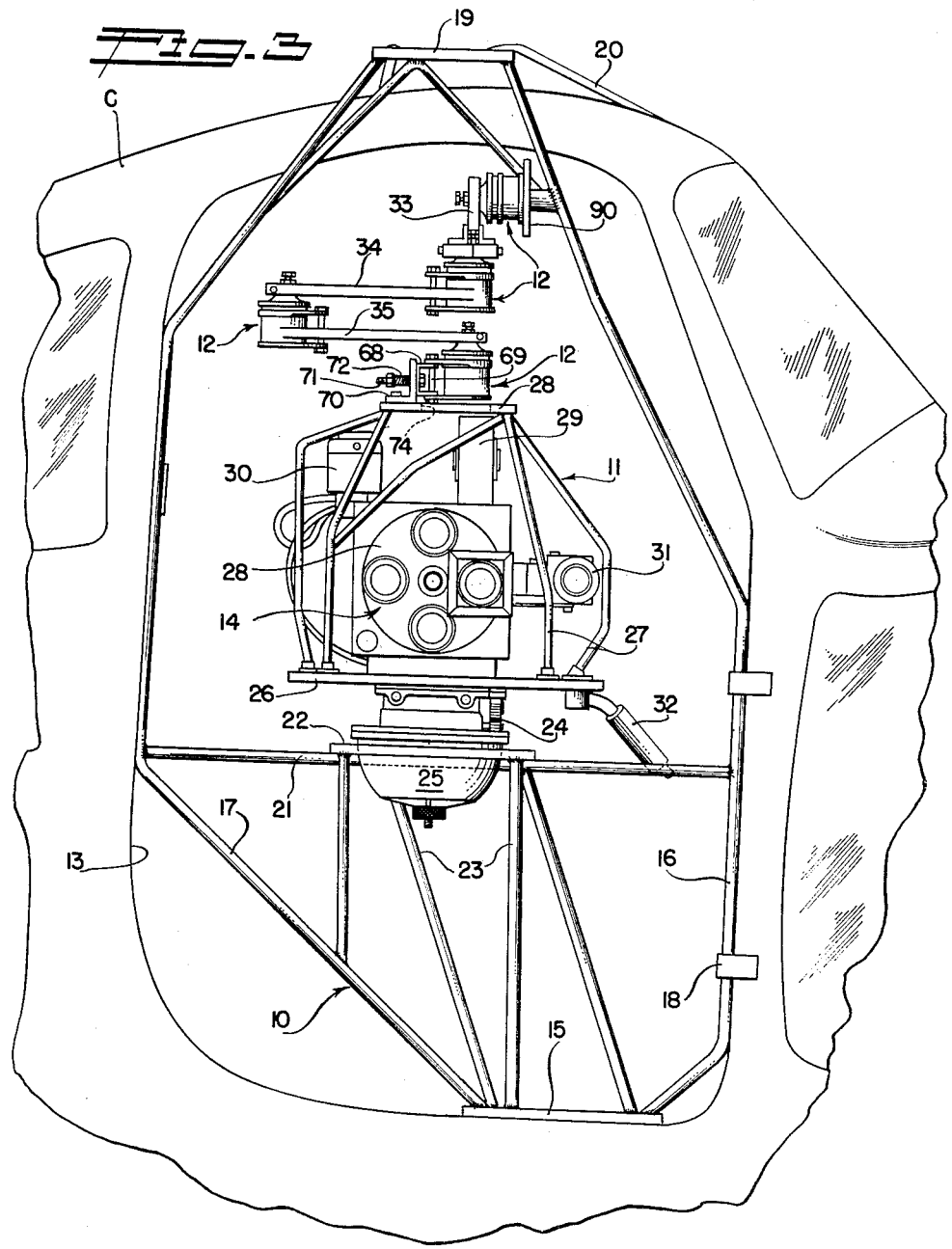
INVENTOR.
ALBERT PAUL MANTZ
BY
*George C. Sullivan*
Agent

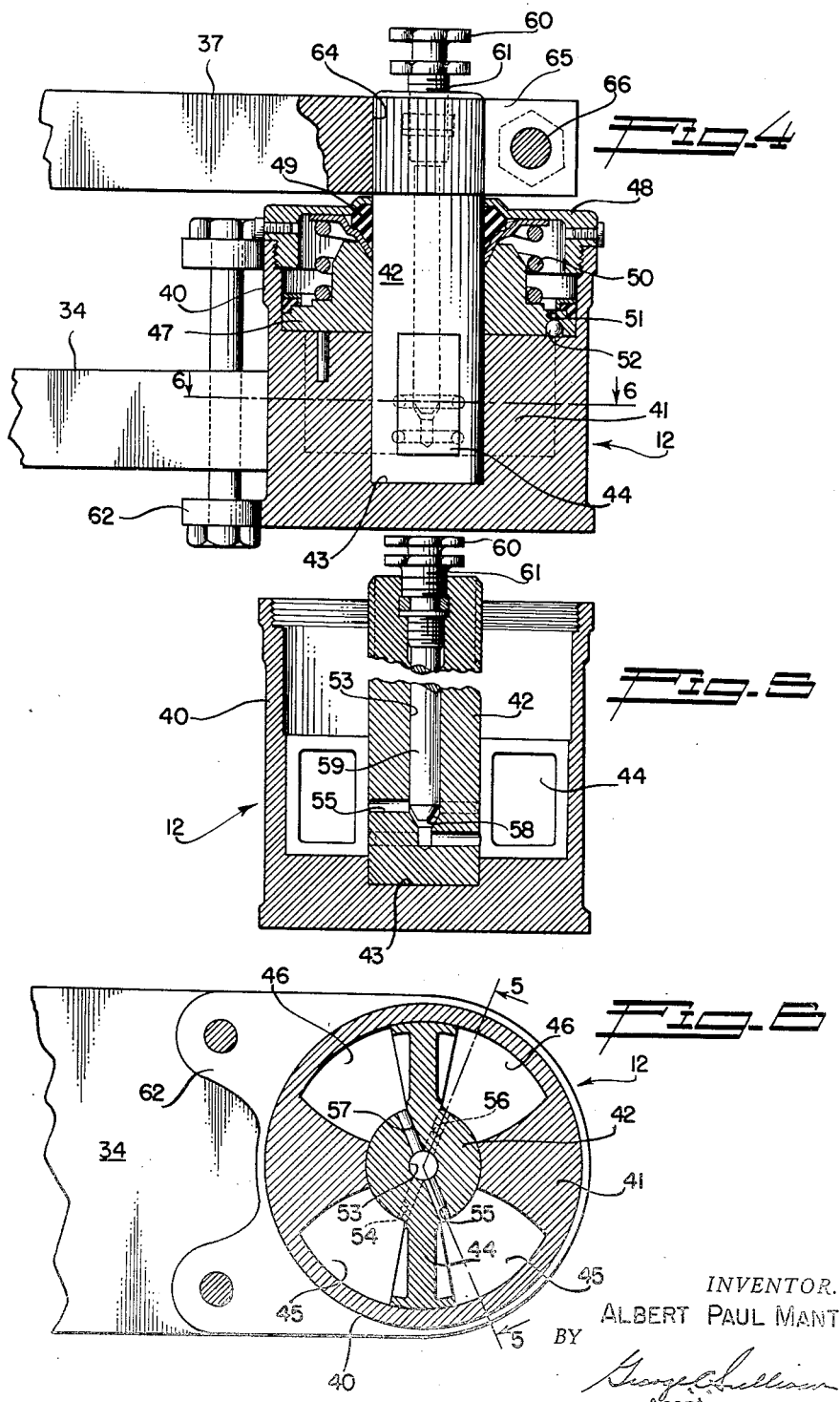

Patented May 2, 1950

2,506,095

UNITED STATES PATENT OFFICE 2,506,095

VIBRATION-DAMPING CAMERA MOUNT

Albert Paul Mantz, Hollywood, Calif.

Application April 13, 1948, Serial No. 20,772

9 Claims. (Cl. 95—12.5)

This invention relates to camera mounts and relates more particularly to vibration damping means for mounting cameras on aircraft and the like. It is a general object of the invention to provide a practical and dependable structure for mounting motion-picture cameras, etc., on helicopters and other aircraft, which structure incorporates means for damping out and materially reducing vibration of the camera.

While the present invention is not confined to any specific application, I will herein disclose a device for mounting motion-picture cameras on helicopters or rotary wing aircraft, it being understood that this is merely one typical embodiment and application of the invention. It is contemplated that the device may be employed, with or without modification, to mount cameras as well as other instrumentalities on various classes of vehicles and on other objects where vibration is a factor.

Recently it has been found that outdoor motion-picture scenes, news events and other outdoor subjects and occurrences may be advantageously photographed by cameras mounted on helicopters. In the case of commercial motion-picture scenes, the employment of cameras carried by helicopters results in a great monetary saving, reduces the time required to photograph the sequences and makes it possible to photograph action that cannot be practically photographed by other methods. However, a helicopter is subject to substantially continuous vibration of varying and considerable amplitude, this vibration being present during hovering of the craft as well as during vertical and horizontal flight. A motion-picture camera is rather large and heavy and in order to obtain a clear field for taking the pictures it is necessary to mount the camera at the exterior of one side of the helicopter cabin. In this position the camera is spaced away from the fore and aft axis of the craft as well as from the center of gravity of the rotor mast, so that the vibration attending rotation of the rotor, operation of the propulsion engine, etc., are amplified or intensified at the camera. As a result of the vibratory motion, the pictures obtained by the camera mounted in this fashion are often blurred and unsatisfactory. Thus the unavoidable vibration accompanying operation of the helicopters presents a serious problem when employing motion-picture cameras on this type of aircraft.

It is an important object of my invention to provide an effective means for reducing to a minimum the vibration of a motion-picture camera mounted on a helicopter or like aircraft.

It is another object of the invention to provide a camera mounting of the character referred to which permits the free, smooth and accurate panoramming of the camera, commonly known in the motion-picture art as "panning." The improved vibration damping and absorbing mount of the invention does not interfere in any way with panning of the camera. The vibration damping characteristics of the mounting, coupled with the full freedom of motion or panning, particularly adapts the device for use in taking action scenes and the like where the objects being photographed and the sustaining helicopter may both be in motion and where smooth vibrationless panning of the camera is essential.

Another object of the invention is to provide a camera mount of the class mentioned that may be readily adjusted or set to offer greater or less resistance to vibration as the conditions of operation may require. The device embodies a plurality of vibration-damping units having spaced angularly related axes of operation, and each of these units may be individually regulated to meet operating conditions.

A further object of the invention is to provide a vibration-absorbing or damping camera mount that is inexpensive to manufacture and that may be easily and quickly attached to and removed from a helicopter or other aircraft. The device is so constructed so that it may be readily installed in the doorway of the aircraft cabin to make the camera conveniently accessible to the cameraman seated within the cabin. When no longer required, the mount and its associated parts may be detached as a single unit from the aircraft for storage or for use on other craft.

Other objectives and advantages of the invention will become apparent from the following detailed description, throughout which description reference is made to the accompanying drawings, wherein:

Figure 1 is a perspective view of the forward portion of a helicopter with the camera mount of the invention installed thereon;

Figure 2 is an enlarged fragmentary perspective view of the mount illustrating the vibration-absorbing linkage system;

Figure 3 is an enlarged front elevation of the camera mounting structure and adjacent portions of the helicopter;

Figure 4 is an enlarged vertical detailed sectional view of one of the vibration-absorbing units with certain parts appearing in side elevation;

Figure 5 is a vertical detailed sectional view of the major components of the unit illustrated in Figure 4, taken substantially as indicated by line 5—5 on Figure 6; and Figure 6 is a transverse sectional view taken as illustrated by line 6—6 on Figure 4.

The mount or device of the invention includes a supporting frame 10 for attachment to the aircraft, a manually movable cage-like structure 11 associated with the camera, a system of links extending between the frame 10 and the cage 11 and vibration-damping devices or units 12 pivotally connecting the links to thereby dampen vibration of the camera.

The frame 10 is intended to be secured to the cabin C of the helicopter or other aircraft and its specific construction may be varied considerably to adapt it for use on aircraft of different types, models, etc. As shown in Figures 1 and 2, the frame 10 is designed to be secured in the doorway 13 of the cabin C to support the camera 14 in a position at the exterior of the cabin. The frame 10 includes a lower plate 15 for resting on the floor of the cabin C at the doorway 13 and two main frame members 16 and 17 fixed to the plate 15 to extend upwardly therefrom in general conformance with the margins of the doorway. Suitable clamps 18, or other attaching means, removably secure the members 16 and 17 to the cabin structure. It is to be understood that the regular door is removed from the cabin C prior to installing the camera mounting structure of the invention. The upper portions of the members 16 and 17 converge and are secured to a connecting plate 19. Additional steadying and securing members 20 extend from the plate 19 across the top of the cabin C for suitable attachment to the craft. A horizontal member 21 extends between and connects with the two side members 16 and 17 and carries an outwardly projecting generally horizontal plate 22. Braces 23 extend from the bottom plate 15 and member 17 to the plate 22 to assist in supporting the same. The frame 10 may include corner braces and other strengthening elements as may be required. It is preferred to construct the frame 10 of tubing, to reduce the weight, and the various parts of the frame may be welded together, it being apparent, of course, that other modes of fabrication may be employed.

The abovementioned plate 22 is provided to carry a panning head 24 which supports the camera 14 for universal movement so that it may be panorammed or panned to follow the action of the scene being photographed. The head 24 may be of any standard or conventional type for limiting or preventing over-travel and backlash during panning of the camera and that assures smooth camera movement. For example, the head 24 may be of the type known in the motion-picture industry as an "Akeley Gyro tripod" head and disclosed in United States Letters Patent Numbers 1,177,165 and 1,394,691. The bowl or lower portion 25 of the head 24 fits within an opening in the plate 22 and its upper end is associated with the camera 14 or the camera cage 11.

The structure or cage 11 serves to house and to assist in supporting the camera 14 and includes a lower flat plate 26. The plate 26 is secured to the panning head 24 and in turn the case of the camera 14 is fixed on the upper side of the plate to be in the proper central or coaxial relation with the head 24. The cage 11 further includes a series of spaced generally upright members 27 attached to the base plate 26 and extending upwardly therefrom. The cage members 27 curve or slope inwardly at their upper portions and their upper ends are secured to a top plate 28. The members 27 are spaced to receive and to give free access to the lens turret 28, film reels 29, driving motor 30 and the various other elements of the camera 14. The camera 14 illustrated is typical, it being understood that the cage 11 may be constructed to house or contain any particular type of style of camera. An inwardly extending handle 32 projects from the under side of the plate 26 to be conveniently accessible to the cameraman or operator seated in the cabin C.

The abovementioned system of links extends between the upper end of the camera carriage or cage 11 and the relatively stationary frame 10, and the vibration-absorbing units 12 pivotally associate the adjacent links of the system one with the other to effectively damp out vibration of the camera. In the preferred construction illustrated there is an upper link 33 arranged to move about a generally horizontal axis, an intermediate link 34 arranged to pivot about a generally vertical axis and a lower link 35 likewise arranged to move about a substantially vertical axis. As will be more fully described below, the links are related and connected to allow full freedom of intentional movement or panning of the camera 14. While the construction may be varied, the upper link 33, as shown, comprises a section 36 disposed in a substantially vertical plane and a section 37 arranged in a generally horizontal plane, the two sections being rigidly secured together by angle members 38. The other links 34 and 35 may be simple elongate plate-like parts and are arranged in spaced parallel relation. One vibration-damping unit 12 pivotally connects the upper link 33 with the frame 10 and a unit 12 assists in pivotally associating the lower link 35 with the cage 11. A substantially vertical mounting plate 39 is suitably fixed to the frame member 16 to facilitate connection of the upper link 33 with the frame.

The several vibration-damping devices or units 12 may be identical and I will therefore proceed with a detailed description of one unit 12 as illustrated in Figures 4, 5 and 6, it being understood that this description is equally applicable to the several units 12. Corresponding reference numerals are applied to the corresponding parts of the units 12.

Each unit 12 includes a hollow or cup-like case 40 provided with a closed lower end. A pair of diametrically opposed stop abutments 41 is provided in the lower portion of the case 40 and a turnable wing shaft 42 extends into the case to be rotatably received between the inner margins of the abutments 41. The lower end of the shaft 42 is rotatably supported in a socket 43 in the bottom wall of the case. The shaft carries two diametrically opposed radially projecting wings 44 which operate in the case 40. The wings 44 extend into the spaces between the two partitions or abutments 41 and the wings and abutments together divide the interior of the case into two pairs of chambers 45 and 46. It will be seen that upon turning the shaft 42 in either direction from an intermediate position such as illustrated in Figure 6, one chamber 45 is reduced in volume and the other chamber 45 is increased while one chamber 46 is diminished and the other chamber 46 increases in size. A flanged ring 47 engages around the shaft 42 and seats downwardly against the upper surfaces of the abutments 41 to close the upper ends of the chambers 45 and 46. A cap 48 is screw threaded in the case 40 above the ring 47 and carries a sealing assembly 49 for sealing about the shaft 42. The sealing assembly 49 is actuated or compressed by a spring 50 arranged under compression against the ring 47. The chamber or space between the flanged ring 47 and the cap 48 constitutes a reservoir for a suitable liquid employed in the chambers 45 and 46. Ports 51 in the ring 47 serve to replenish the liquid that may leak from the chambers 45 and 46, and the ports are equipped with ball check valves 52 to prevent a reverse flow of the liquid.

The wing shaft 42 has a central longitudinal opening 53 entering it from the upper end. Radial ports 54 and 55 disposed in vertically spaced planes are provided in the lower portion of the shaft 42 to extend between the opening 53 and the chambers 45. The ports 54 and 55 communicate with their respective chambers 45 immediately adjacent a wing 44. A similar set of vertically spaced ports 56 and 57 is provided in the shaft 42 to connect the chambers 46 with the shaft opening 53. A valve seat 58 is formed in the opening 53 immediately below the upper ports 55 and 57. The control of the liquid flow through the ports 54, 55 and 57 resists or controls relative angular movement between the case 40 and the shaft 42. A needle valve 59 extends into the opening 53 and opposes or cooperates with the seat 58 to provide this control for the liquid flow. The valve 59 is adjustably screw threaded in the upper portion of the opening 53 and has a projecting polygonal head 60 to facilitate its adjustment. A lock sleeve 61 may be employed to set or lock the valve 59 in its adjusted position. By adjusting the valve 59 in relation to its seat 58 the flow of liquid through the port system 54, 55, 56 and 57 may be regulated to cause the unit 12 to offer the required degree of resistance to sudden or vibratory motion.

Relatively slow angular movement of the shaft 42 with relation to the case 40 is resisted to a minimum extent, the valve 59 usually being set to permit sufficient flow through the ports 54, 55, 56 and 57 to allow such slow movement. However, upon abrupt or sudden relative angular movement between the case 40 and the shaft 42 such as accompanies vibration, the wings 44 tend to move to suddenly decrease the size of one chamber 45 and one chamber 46 while at the same time tend to suddenly increase the size of the other chamber 45 and the second chamber 46. This sudden relative movement is effectively resisted because the needle valve 59 opposing its seat 58 allows only a limited liquid flow between the chambers 45 and from one chamber 46 to the other chamber 46. Accordingly rapid or abrupt relative angular movement between the shaft 42 and the case 40 is resisted or damped. It will be noted that the unit 12 resists such relative movement in both directions and that the engagement of the wings 44 with the abutments 41 positively limits the relative movement to slightly less than a 180° stroke.

The wing shaft 42 projects beyond the upper end of the case 40 and its projecting portion is serrated. The case 40 of the unit has pairs of spaced projecting attaching lugs or ears 62 best illustrated in Figures 4 and 6.

Referring again to the linkage system 33, 34 and 35, it will be seen that one of the above-described vibration-absorbing units 12 connects one end of the link 33 with the attaching plate 90 in the upper portion of the frame 10. The unit 12 is substantially horizontal and the closed end of its case 40 is secured to the plate 90 by bolts 63 engaged through openings in the ears 62 and the plate. The serrated portion of the wing shaft 42 is engaged in an opening in the link section 36 to secure the link 33 to the shaft. The link section 36 has a slit extending from the shaft-receiving opening to its adjacent end and a clamping bolt extends through openings in the split portion to clamp the link on the serrated shaft 42. This form of connection is illustrated in Figure 4 where 64 is the opening receiving the shaft 42, 65 is the split in the link and 66 is the clamping bolt. From the foregoing it will be apparent that the unit 12 pivotally associates the link 33 with the plate 90 of the frame 10 in such a manner that the link may move about a horizontal axis.

The adjacent ends of the links 33 and 34 are pivotally connected by another vibration-absorbing unit 12. In this instance the unit 12 is substantially vertically positioned and its serrated wing shaft 42 is secured or clamped in the split end of the link section 37 while bolts 66 secure its case 40 to the link 34. As the connections between the units 12 and the several links may be identical with the structure shown in Figure 4, the reference numerals of Figure 4 will be applied to the splits 65, clamping bolts 66, etc., of the several connections.

The other end of the link 34 is connected with the adjacent end of the third link 35 by another vibration-absorbing unit 12. Here again the unit 12 is substantially vertically arranged to provide for relative angular movement of the links about a vertical axis. The bolts 63 secure the case 40 of the unit 12 to the link 35 while a clamp bolt 66 secures the split end of the link 34 on the wing shaft 42.

The opposite end of the third link 35 is connected with the top plate 28 of the camera carrier or carriage 11 by a vibration-absorbing unit 12 and a frictional pivotal connection. This unit 12 is arranged at the under side of the link 35 and its projecting serrated shaft 42 is clamped in the split end of the link. A channel member 68 is secured to the case 40 of the unit 12 by bolts 69 engaged through the ears 62 of the case. The channel member 68 opposes and bears against an angle part 70 fixed on the top plate 28 of the cage 11. A bolt 71 is engaged in aligned openings in the member 68 and angle part 70 and a spring 72 is arranged under compression between the part 70 and the nut of the bolt. The spring 72 maintains the surfaces of the angle member 68 and part 70 in pressure contact to yieldingly resist relative pivotal movement between the cage 11 and the lowermost vibration-absorbing unit 12. The nut of the bolt 71 may be adjusted to vary the resistance to pivotal movement. The operational axis of the frictional pivotal connection just described is parallel with the pivotal axis of the uppermost unit 12 which connects the upper link 33 with the frame 10. An opening 74 is provided in the top plate 28 of the cage 11 to freely receive the adjacent vibration-absorbing unit 12 and associated parts upon angular movement of the cage 11 about a horizontal axis.

From the foregoing detailed description it will be apparent that the camera 14 and its cage 11 are supported by the head 24 for universal angular movement and for tilting in various directions. This permits the camera to be panorammed during photographing of pictures from the helicopter. The linkage system 33, 34 and 35 with its vibration-absorbing units 12 and the related frictional pivotal connection at the bolt 71, do not interfere with such movement of the camera. There are three units 12 having substantially vertical axes to allow movement of the camera 14 about a vertical axis, and the uppermost unit 12 and the connection at the bolt 71 have horizontal axes to allow for movement of the camera about a horizontal axis. The movement-damping units 12 and the frictional connection at the bolt 71 may assist the universal head 24 in assuring smooth, steady panning movement of the camera. However, this is not the primary purpose of the linkage system and its vibration-absorbing units 12. The camera 14, supported at one side of the helicopter, is subjected to the severe vibrations which accompany flight operations of the helicopter. These vibratory motions are effectively damped out and reduced to a minimum by the plurality of vibration-absorbing units 12 arranged on vertical and horizontal axes as above described. Each unit 12 operates to independently dampen out vibration occuring about its axis of operation and which tend to cause relative angular movement of the associated links. Thus the three units 12 associated with the links 34 and 35 absorb or reduce vibration tending to move the camera horizontally while the uppermost unit 12 and the frictional connection at the bolt 71 absorb vibration tending to move the camera vertically. A considerable mechanical advantage is also obtained by reason of the location of the linkage system between the top of the cage 11 and the frame 19 and because the lengths of the links themselves. I have found in actual practice that the camera mount herein described prevents any appreciable vibration of the camera 14 even during helicopter flights and operations which cause substantial vibration of the helicopter.

Having described only a typical preferred embodiment of the invention, I do not wish to be limited to the specific details herein set forth but wish to reserve to myself any features or modifications that may fall within the scope of the following claims.

I claim:

1. In a device for mounting a camera on an object subject to vibration, a supporting frame for attachment to the object, a cage secured to the camera and extending upwardly therefrom, means carried by the frame and supporting the camera and the lower end of the cage for universal panoramming movement, a system of links connecting the upper end of the cage with the frame, and vibration-damping devices pivotally connecting the links of said system.

2. In a device for mounting a camera on an object subject to vibration, a supporting frame for attachment to the object, a cage in which the camera is secured and extending upwardly beyond the camera, means carried by the frame and supporting the camera and the lower end of the cage for universal panoramming movement, a system of links extending between the frame and camera, vibration-absorbing devices pivotally connecting the links of said system, a connection between the lower end of said system of links and the upper end of the cage, and a vibration-absorbing device pivotally connecting the upper end of said system of links with the frame.

3. In a device for mounting a camera on an object subject to vibration, a supporting frame for attachment to the object, a cage in which the camera is secured, means carried by the frame and supporting the camera and its cage for universal panoramming movement, a system of links extending between the frame and cage, vibration-absorbing devices pivotally connecting the links of said system, means pivotally connecting said system of links with the cage, and a vibration-absorbing device pivotally connecting said system of links with the frame, at least one of said devices having a generally horizontal axis of action and at least one of said devices having a generally vertical axis of action.

4. In a device for mounting a camera on an object subject to vibration, a supporting frame for attachment to the object, a cage around and supporting the camera, means carried by the frame and supporting the camera and its cage for universal panoramming movement, a system of three generally parallel links extending from the cage to the frame, vibration-absorbing devices connecting the links one with the other for relative angular movement about generally vertical axes, a vibration-absorbing device connecting the link at one end of the system with the frame for relative angular movement about a generally horizontal axis, and means connecting the link at the other end of said system with the cage for relative angular movement about a generally horizontal axis.

5. In a device for mounting a camera on an aircraft, a supporting frame for attachment to the aircraft, a cage supporting the camera, means carried by the frame and supporting the camera and its cage for universal panoramming movement, a system of links extending between the frame and camera, vibration-absorbing devices pivotally connecting the links of said system, a vibration-absorbing device pivotally connecting one end of said system of links with the frame, at least one of said devices having a generally horizontal axis of action and at least one of said devices having a generally vertical axis of action, said devices including means for regulating their resistances to vibration, and a pivotal connection between the other end of said system of links and the cage.

6. A device for mounting a camera on an aircraft comprising a generally upright frame for attachment to the aircraft, a support projecting laterally from the frame, a structure attached to the camera and extending upwardly therefrom, means on said support carrying the camera and the lower portion of said structure for universal movement, a system of links connected between the upper portion of said structure and the frame, and vibration-absorbing devices connecting the links of said system for relative angular movement to dampen vibration of the camera.

7. A device for mounting a camera on an aircraft comprising a generally upright frame for attachment to the aircraft, a support projecting laterally from the frame, a structure attached to the camera and extending upwardly therefrom, means on said support carrying the camera and said structure for universal movement, a system of links extending between the upper portion of said structure and the frame, vibration-damping devices connecting the links of said system for relative angular movement, a vibration-damping device connecting one end of said system with the frame, and means connecting the other end of said system with the upper portion of said structure and including a vibration-damping device, at least one of said devices serving to dampen vibration of the camera by resisting movement of its associated link about a vertical axis, and at least one of said devices serving to dampen vibration of the camera by resisting movement of its associated link about a horizontal axis.

8. A device for mounting a camera on an aircraft cabin having a doorway comprising a frame secured in the doorway, a support projecting outwardly from the frame, a structure rigid with the camera and extending upwardly therefrom, means mounting the camera and the lower portion of said structure on the support for universal movement, and means for damping vibration of the camera including a system of links connected between the upper portion of the structure and the frame, and devices pivotally connecting the links of said system one with the other and operable to resist sudden relative pivotal movement of the links.

9. A device for mounting a camera on an aircraft cabin having a doorway comprising a frame secured in the doorway, a support projecting outwardly from the frame, a structure rigidly connected with the camera and extending upwardly therefrom, means mounting the camera and said structure on the support for universal movement, and means for damping vibration of the camera including a system of links extending between the upper portion of the structure and the frame, devices connecting the links of said system for relative angular movement about generally vertical axes and operable to resist sudden relative angular movement of the links, means connecting the upper end of said system with the frame including a device for resisting sudden relative angular movement of the frame and said system about a generally horizontal axis, and means connecting the lower end of said system with said structure including a friction device for resisting relative angular movement of said system and structure about a generally horizontal axis.

ALBERT PAUL MANTZ.

REFERENCES CITED

The following references are of record in the file of this patent:

UNITED STATES PATENTS

| Number | Name | Date |
| --- | --- | --- |
| 1,221,902 | Pederson | Apr. 10, 1917 |
| 1,482,244 | Morton | Jan. 29, 1924 |
| 1,824,085 | Karnes et al. | Sept. 22, 1931 |
| 2,318,806 | Sisson et al. | May 11, 1943 |

FOREIGN PATENTS

| Number | Country | Date |
| --- | --- | --- |
| 715,342 | France | Sept. 28, 1931 |
| 548,378 | Great Britain | Oct. 8, 1942 |